United States Patent [19]

Kochanowski

[11] 4,334,030

[45] Jun. 8, 1982

[54] THERMOPLASTIC FOAMABLE BLENDS

[75] Inventor: John E. Kochanowski, Monterey, Mass.

[73] Assignee: General Electric Company, Pittsfield, Mass.

[21] Appl. No.: 97,017

[22] Filed: Nov. 23, 1979

[51] Int. Cl.$^3$ .............................. C08J 9/08; C08J 9/10
[52] U.S. Cl. ........................................ 521/90; 521/95;
521/139; 521/143; 521/145; 521/146; 521/180;
521/184; 521/189
[58] Field of Search .................... 521/90, 95, 139, 180

[56] References Cited

U.S. PATENT DOCUMENTS

| | | | |
|---|---|---|---|
| 3,278,466 | 10/1966 | Cram et al. | 521/95 |
| 3,888,801 | 6/1975 | Hunter et al. | 521/95 |
| 4,097,425 | 6/1978 | Niznik | 521/90 |
| 4,174,432 | 11/1979 | Niznik | 521/95 |

*Primary Examiner*—Morton Foelak
*Attorney, Agent, or Firm*—William F. Mufatti

[57] ABSTRACT

Foamable blends are provided of high performance thermoplastic polymers such as polyphenylene oxides, polystyrenes, etc., and an effective amount of a first blowing agent which is an amide derivative of azodicarboxylic acid and a second blowing agent which is a dihydrooxadiazinone.

17 Claims, No Drawings

THERMOPLASTIC FOAMABLE BLENDS

This invention relates to thermoplastic foamable blends of a thermoplastic organic polymer, a first blowing agent which is a dihydrooxadiazinone, and a second blowing agent which is an amide derivative of azodicarboxylic acid.

BACKGROUND OF THE INVENTION

Prior to the present invention, the plastics industry expended considerable effort towards the study and development of high performance thermoplastic foams for the purpose of making lightweight structural substitutes for metal in various applications such as used in the automotive industry. Examples of these blowing agents include hydrazodicarboxylates and the amide derivatives of azodicarboxylic acid, such as azodicarbonamide. As shown by Hunter et al, U.S. Pat. No. 3,888,801, hydrazodicarboxylates have commonly been employed as blowing agents for various thermoplastic organic polymers for the purpose of reducing the overall weight of particular thermoplastic materials when molded to a specific shape. Other blowing agents, which are commonly used with various thermoplastic organic polymers, are 5-phenyl-tetrazole, benzamides, etc., as shown by Muller et al, U.S. Pat. No. 3,781,233, and Wirth et al, U.S. Pat. No. 3,779,954. Although hydrazodicarboxylates, such as diisopropyl hydrazodicarboxylate and 5-phenyltetrazole have generally been found effective for reducing the density of many thermoplastic organic polymers, such as polycarbonates, polyesters, polyacrylates, etc., it has been shown that a significant degree of polymer degradation can occur during the foaming process. Polymer degradation is generally evidenced by a reduction in the intrinsic viscosity of the polymer when a comparison of polymer intrinsic viscosity is made before and after foaming. Polymer degradation is also directly related to reduction in foam impact strength.

Although it is not completely understood, one possible explanation as to why blowing agents, such as the above-described hydrazodicarboxylates can cause a significant degree of polymer degradation upon foaming, is that such blowing agents have decomposition byproducts such as aliphatic alcohols, ammonia, water, etc.

Blowing agents such as the above-described benzazimides and bisbenzazimides are also polymer degradation prone, since water is a decomposition byproduct. Those skilled in the art know that careful drying of high performance thermoplastics, such as polycarbonates, is required prior to molding because of possible risk of polymer degradation. It would be desirable, therefore, to provide blowing agents which can be employed in a variety of high performance thermoplastic organic polymers, such as polyesters, polycarbonates, etc., which do not degrade the thermoplastic polymer and which resist an adverse reduction in impact strength of the foam product beyond that normally expected from the change in the density of the material as the result of foaming.

Such blowing agents are the dihydrooxadiazinones described in U.S. Pat. No. 4,097,425 to Niznik. While these blowing agents generally are satisfactory and avoid the disadvantages of the prior mentioned blowing agents, it has now been found that, if a second blowing agent which is an amide derivative of azodicarboxylic acid is added to the blends containing said dihydrooxadiazinones, the density of the foamed structures obtained from these foamable thermoplastic compositions is reduced. This results in foamed structures having less stressing and warpage than foamed structures having higher densities. Furthermore, the cellular structure of the foamed structures obtained from these blends is well defined and uniform.

DESCRIPTION OF THE INVENTION

The present invention is based on the discovery that when a blowing agent which is the amide derivative of azodicarboxylic acid is added to a thermoplastic foamable composition containing a thermoplastic hydrolytically stable polymer and a dihydrooxadiazinone blowing agent, the resulting foamed structure made therefrom has reduced stressing and warpage compared to a structure made from a composition lacking this amide or ester derivative of azodicarboxylic acid.

There is provided by the present invention, substantially uniform injection moldable blends comprising (i) a thermoplastic organic polymer, and (ii) from about 0.1 to about 10 percent by weight of the blend of a first dihydrooxadiazinone blowing agent and a second blowing agent which is an amide derivative of azodicarboxylic acid, the weight ratio of said first blowing agent to said second blowing agent being in the range from 80:20 to 20:80.

Some of the dihydrooxadiazinones which can be employed in making the blends of the present invention are described by M. Rosenblum et al, J. Amer. Chem. Soc., 85, 3874 (1963). The dihydrooxadiazinones which can be employed in making the blends of the present invention are described in U.S. Pat. No. 4,097,425, which is incorporated herein by reference. These dihydrooxadiazinones are compounds represented by the general formula

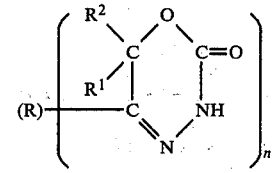

where n is an integer equal to 1 or 2; R is a monovalent radical when n is 1, and a divalent radical when n is 2, selected from a $C_{(1-8)}$ alkyl radical or alkylene radical, a $C_{(6-30)}$ aryl radical or arylene radical and halogenated derivatives thereof; $R^1$ and $R^2$ are the same or different monovalent radicals selected from hydrogen, $C_{(1-8)}$ alkyl, alkylene, $C_{(6-30)}$ aryl, alkoxy, aryloxy and where $R^1$ and $R^2$ are both alkyl, they can be part of a cyclo aliphatic ring structure.

Radicals included by R of Formula I are $C_{(1-8)}$ alkyl radicals, such as methyl, ethyl, propyl, butyl, etc.; aryl radicals such as phenyl, tolyl, xylol, napthyl, anthryl, etc.; halo alkyls such as chloroethyl, trifluoropropyl, etc.; halo aryls such as chlorophenyl, bromotolyl, etc.; nitro aryls and sulfoaryls. Radicals included by $R^1$ and $R^2$ are hydrogen, and $C_{(1-8)}$ alkyl radicals such as methyl, ethyl, propyl, etc.; alkoxy radicals such as methoxy, ethoxy, propoxy, butoxy, etc.; aryloxy radicals such as phenoxy, cresoxy, napthoxy, etc. In particular instances where $R^1$ and $R^2$ are both alkyl they can be part of a cycloaliphatic ring structure such as cyclopentyl, cyclohexyl, cycloheptyl. In other situations where $R^1$ and $R^2$ are both aryl, they can be phenyl, tolyl, xylyl, napthyl, anthryl, or a mixture of any two of the aforementioned aryl radicals.

Some of the dihydrooxadiazinones which can be used in the practice of the invention are, for example:
5,6-dimethyl-3,6-dihydro-1,3,4-oxadiazin-2-one
5,6-trimethyl-3,6-dihydro-1,3,4-oxadiazin-2-one
5-ethyl-6-methoxy-3,6-dihydro-1,3,4-oxadiazin-2-one
5,6-diphenyl-3,6-dihydro-1,3,4-oxadiazin-2-one
5-phenyl-3,6-dihydro-1,3,4-oxadiazin-2-one
5-(p-bromophenyl)-3,6-dihydro-1,3,4-oxadiazin-2-one
5-phenyl-6-methyl-3,6-dihydro-1,3,4-oxadiazin-2-one
5,6-bis(p-methoxyphenyl)-3,6-dihydro-1,3,4-oxadiazin-2-one
5-naphthyl-3,6-dihydro-1,3,4-oxadiazin-2-one
5-(o,o,p-tribromophenyl)-6-propyl-3,6-dihydro-1,3,4-oxadiazin-2-one
5-(p-hydroxyphenyl)-3,6-dihydro-1,3,4-oxadiazin-2-one
5-phenyl-6,6-cyclopentylene-3,6-dihydro-1,3,4-oxadiazin-2-one
5-(m-nitrophenyl)-3,6-dihydro-1,3,4-oxadiazin-2-one
5-(p-benzenesulfonic acid sodium salt)-3,6-dihydro-1,3,4-oxadiazin-2-one
5-(2-fluorenyl)-6-trifluoroethyl-3,6-dihydro-1,3,4-oxadiazin-2-one
5-phenyl-6-(cyanophenylmethyl)-3,6-dihydro-1,3,4-oxadiazin-2-one
5-phenyl-6-cyano-6-methyl-3,6-dihydro-1,3,4-oxadiazin-2-one
and such polycyclic formulas resulting from divalent substitution as

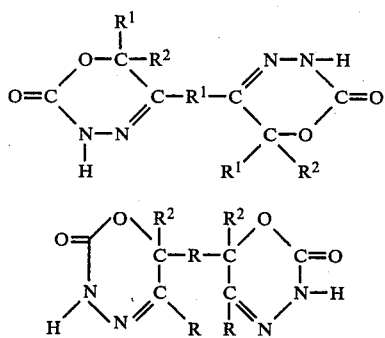

The amide derivatives of azodicarboxylic acid are compounds represented by the general formula

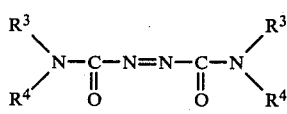

wherein $R^3$ and $R^4$ are independently selected from hydrogen and alkyl radicals. Preferred alkyl radicals are those containing from 1 to about 10 carbon atoms such as methyl, ethyl, propyl, butyl, isobutyl, tert-butyl, pentyl, octyl, and the like.

Preferred compounds of formula II are those where either $R^3$ or $R^4$ represent hydrogen radicals. The most preferred compound represented by formula II is one wherein both $R^3$ and $R^4$ represent hydrogen radicals, i.e., azodicarbonamide.

Included by the term "thermoplastic organic polymer" which can be used in the practice of the invention includes, for example, any organic polymer which can be injection molded at least twice at a temperature in the range of from 150° C. to 400° C. such as polyolefins such as poly(hexafluoropropylene), polypropylene, polyacrylates and polymethacrylates, polystyrenes such as polystyrene, poly(4-tert-butylstyrene), poly(4-bromostyrene), poly(α-methylstyrene), polyamides such as polycaprolactam and poly-hexamethyleneadipamide, polyvinylchloride, polyphenylene oxide based resins, including blends with polystyrene, polyarylsulfones, ABS polymers, polystyreneacrylonitrile copolymers, polyacetals, urethane elastomers, polyphenylene sulfide, polyimides, polysilphenylenes; also various copolymers, block copolymers, polymer blends and alloys of the components mentioned above.

In the practice of the present invention, the thermoplastic blends can be made in the form of a dry powder, in an extruded pelletized form, in the form of an extruded thermoplastic sheet, etc., based on the melt characteristic of the thermoplastic organic polymer and the decomposition temperatures of the two blowing agents. An effective amount of the two blowing agents are added to the thermoplastic organic polymer. By effective amount is meant an amount effective to form a foamable composition. Generally, this ranges, based on the combined weights of the two blowing agents, in percent by weight, from about 0.1% to about 10%, preferably from about 0.1% to about 5%, more preferably from 0.1% to about 2%, and most preferably from about 0.25% to about 1%. Generally, the weight ratio of the dihydrooxadiazinone blowing agent to the amide derivative of axodicarboxylic acid can be in the range of from about 1:9 to about 9:1, preferably from about 1:4 to about 4:1, and more preferably from about 1:3 to about 1:1. A particular preferred combination of the two blowing agents and thermoplastic organic polymer either in the form of a concentrate or foamable blend is a combination of a polyphenylene ether with 5-phenyl-3,6-dihydro-1,3,4-oxadiazin-2-one and azodicarbonamide as blowing agents. A preferred polyphenylene ether is one modified with styrene resin. Such polyphenylene ether-styrene resin blends are described in U.S. Pat. No. 3,383,435, incorporated herein by reference.

A class of preferred thermoplastic organic blends convertible to high performance foams in accordance with the practice of the invention utilize high performance thermoplastic organic polymer in combination with: (i) a dihydrooxadiazinone of the formula

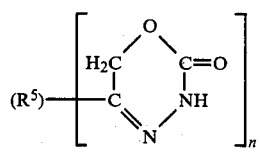

where $R^5$ is a monovalent or divalent $C_{(6-30)}$ aryl radical within the scope of dihydrooxidaizinones, as previously defined; and, (ii) an amide derivative of azodicarboxylic acid of the formula

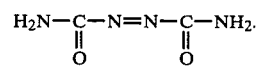

Preferred blends can be in the form of a powder, pellet, or sheet with an organic polymer selected from polyphenylene oxide and polyphenylene oxide-polystyrene blends.

The thermoplastic blends of the present invention also can contain other active or inactive fillers, for example, carbon black, fiber glass, chalk, antioxidants, flame retardants, such as triphenyl phosphate, stabilizers, such as salts of lead, cadmium, calcium, zinc, tin or barium, waxes, dyes, pigments, zinc oxides, etc.

In addition to the above-described blends in pelletized, powder or sheet form, the present invention is also directed to a concentrate for blending with a thermoplastic organic polymer to form a foamable composition. The concentrates are comprised of (a) a thermoplastic organic polymer as described above; and, (b) (i) a first blowing agent which is a dihydrooxadiazinone, and (ii) a second blowing agent which is an amide derivative of azodicarboxylic acid. These concentrates contain from about 1% to about 30% by weight or more of (b), i.e., the combined weight of the two blowing agents ranges from about 1% to about 30%, based on the weight of the blowing agents and thermoplastic organic polymer. Preferably, the concentrates contain from about 5% to about 10% of (b). A particular preferred concentrate is a combination of polyphenylene ether, preferably a polystyrene modified polyphenylene ether, a dihydrooxadiazinone of formula III, preferably 5-phenyl-3,6-dihydro-1,3,4-oxadiazin-2-one, and the amide derivative of azodicarboxylic acid of formula III. The concentrate of the present invention can be added to the same type of thermoplastic organic polymer as that which is present in the concentrate to form a thermoplastic foamable composition. Generally, the weight ratio of the dihydrooxadiazinone to the amide derivative of azodicarboxylic acid can range from about 1:9 to about 9:1, preferably from about 1:4 to about 4:1, and more preferably from about 1:3 to about 1:1. In general, sufficient concentrate is blended with the thermoplastic polymer to provide a foamable composition containing from about 1 weight percent to about 33 weight percent of the concentrate based on the weight of the concentrate and thermoplastic polymer.

In addition to the above-described concentrate and foamable thermoplastic blends, the present invention is also directed to foamed shaped structures derived from the aforementioned blends by conventional injection molding techniques and the like which foamed thermoplastic structures have improved cellular structure and surface characteristics.

In order that those skilled in the art will be better able to practice the invention, the following examples are given by way of illustration and not by way of limitation. All parts are by weight.

EXAMPLE 1

One hundred pounds of polyphenylene ether-polystyrene resin pellets are mixed by tumble blending with 0.25 pounds of azodicarbonamide powder and 0.25 pounds of 5-phenyl-3,6-dihydro-1,3,4-oxadiazin-2-one powder. The resulting blend is molded at 540° F. and an injection speed of 0.3 seconds into a 6"×18"×¼" end gated plaque. The minimum density obtainable with this composition is 0.79 g/cc.

EXAMPLE 2

One hundred pounds of polyphenylene ether-polystyrene resin pellets are mixed by tumble blending with 0.5 pounds of azodicarbonamide powder. The resulting blend is molded at 540° F. and an injection speed of 0.3 seconds into a 6"×18"×¼" end gated plaque. The minimum density obtainable with this composition is 0.79 g/cc.

EXAMPLE 3

One hundred pounds of polyphenylene ether-polystyrene resin pellets are mixed by tumble blending with 0.5 pounds of 5-phenyl-3,6-dihydro-1,3,4-oxadiazin-2-one powder. The resulting blend is molded at 540° F. and an injection speed of 0.3 seconds into a 6"×18"×¼" end gated plaque. The minimum density obtainable with this composition is 0.93 g/cc.

EXAMPLE 4

The blends of Examples 1 and 2 are molded into 6"×18"×¼" end gated plaques at 540° F. to a density of 0.85 g/cc. The plaques are cut crosswise at intervals of 4", 8", 12" and 16" from the location of the gate and the cross sections are examined. The plaques molded from the blend described in Example 1 exhibit a more uniform cellular structure than plaques molded from the blend described in Example 2; large voids are evident in the plaques molded from the blend described in Example 2 at the 8", 12", and 16" intervals.

EXAMPLE 5

This example illustrates the preparation of a concentrate. A mixture of 80 parts by weight of high impact polystyrene, 5 parts by weight of 2,6-dimethylpolyphenyleneoxide, 15 parts by weight of triphenylphosphate, 7.5 parts by weight of azodicarbonamide, and 2.5 parts by weight of 5-phenyl-3,6-dihydro-1,3,4-oxadiazin-2one is extruded at 460° F. The extrudate shows no signs of decomposition of either of the blowing agents.

EXAMPLE 6

Five parts by weight of the concentrate prepared substantially in accordance with Example 5 are dry tumbled with 100 parts by weight of polyphenylene ether-polystyrene resin containing triphenyl phosphate flame retardant. This blend is molded on a 125 ton Siemag Structomat molding machine at 560° F. into 6"×18"×¼" plaque molds, at injection speeds of 0.3 and 0.9 seconds. The densities of the plaques are 0.85 g/cc. Upon breaking the plaques at 4", 8", 12" and 16" from the gate, both plaques exhibit a fine and uniform cellular structure.

EXAMPLE 7

A mixture of 80 parts by weight of high impact polystyrene, 5 parts by weight of 2,6-dimethylpolyphenyleneoxide, 15 parts by weight of triphenylphosphate and 10 parts by weight of azodicarbonamide is extruded at 460° F. The extrudate evidenced signs of decomposition of the blowing agent, i.e., pellets exhibit cellular voids and float when placed in water. Attempts to lower the temperature to control the blowing agent decomposition result in extruder stalling and non-economical extrusion rates.

Thus, the foamable compositions of the present invention provide foamed articles having low densities, uniform and fine cellular structure, smooth surfaces, and stable blowing agents.

Although the above examples are limited to only a few of the thermoplastic organic polymers, dihydrooxadiazinones and amide derivatives of azodicarboxylic acids which can be used in the practice of the present invention, it should be understood that the present invention is directed to foamable compositions comprising the dihydrooxadiazinones of formula I, the amide derivatives of azodicarboxylic acid of formula II, and the thermoplastic organic polymers described prior to these examples.

What I claim as new and desire to secure by Letters Patent of the United States is:

1. A substantially uniform injection moldable foamable blend comprising:
   (i) a thermoplastic organic polymer;
   (ii) a dihydrooxadiazinone represented by the formula

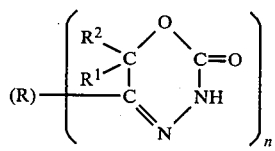

wherein n is an integer equal to 1 or 2; R is a monovalent radical when n is 1, and a divalent radical when n is 2, selected from a $C_{(1-8)}$ alkyl radical or alkylene radical, a $C_{(6-30)}$ aryl radical or arylene radical and halogenated derivatives thereof; $R^1$ and $R^2$ are independently selected from hydrogen, $C_{(1-8)}$ alkyl, alkylene, $C_{(6-30)}$ aryl, alkoxy and aryloxy radicals; and, (iii) amide derivatives of azodicarboxylic acid represented by the general formula

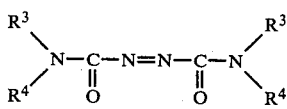

wherein $R^3$ and $R^4$ are independently selected from hydrogen and $C_{(1-10)}$ alkyl radicals.

2. A blend according to claim 1 wherein $R^3$ and $R^4$ are hydrogen radicals.

3. A blend according to claim 2 wherein said dihydrooxadiazinone is 5-phenyl-3,6-dihydro-1,3,4-oxadiazin-2-one.

4. A blend according to claim 1 wherein the combined weight of (ii) and (iii) ranges from about 0.1 to about 10 weight percent of said blend.

5. A blend according to claim 4 wherein the weight ratio of (ii) to (iii) ranges from about 80:20 to about 20:80.

6. A blend according to claim 1 wherein said thermoplastic organic resin is a polyphenylene ether.

7. A blend according to claim 6 wherein said polyphenylene ether is a polystyrene modified polyphenylene ether.

8. A blend according to claim 7 wherein said polystyrene is high impact polystyrene.

9. A blend according to claim 3 wherein said thermoplastic organic resin is a high impact polystyrene modified polyphenylene ether.

10. A blend according to claim 9 wherein said high impact polystyrene modified polyphenylene ether contains flame retardant amount of a flame retardant compound.

11. A blend according to claim 10 wherein said flame retardant compound is triphenyl phosphate.

12. A blend according to claim 9 wherein said blend contains from about 0.1 to about 10 weight percent of 5-phenyl-3,6-dihydro-1,3,4-oxadiazin-2-one and azodicarbonamide.

13. A blend according to claim 12 wherein the weight ratio of said 5-phenyl-3,6-dihydro-1,3,4-oxadiazin-2-one to said azodicarbonamide ranges from about 80:20 to about 20:80.

14. A blend according to claim 1 in the form of a dry powder.

15. A blend according to claim 1 in the form of pellets.

16. An injection moldable concentrate in accordance with claim 1 containing from about 1 to about 30 weight percent of the (ii) and (iii).

17. An injection moldable concentrate in accordance with claim 16 wherein the weight ratio of (ii) to (iii) ranges from about 9:1 to about 1:9.

* * * * *